United States Patent
Curtis et al.

Patent Number: 5,838,467
Date of Patent: Nov. 17, 1998

[54] METHOD FOR PROCESSING INFORMATION STORED IN A HOLOGRAPHIC SYSTEM

[75] Inventors: Kevin Richard Curtis, Summit; Michael C. Tackitt, Califon, both of N.J.

[73] Assignee: Lucent Technologies Inc., Murray Hill, N.J.

[21] Appl. No.: 868,406

[22] Filed: Jun. 3, 1997

[51] Int. Cl.⁶ .................................................. G03H 1/04
[52] U.S. Cl. .................................................. 359/3; 359/32
[58] Field of Search .................................. 359/3, 32, 22, 359/24, 27, 33

[56] References Cited

U.S. PATENT DOCUMENTS 4,953,924  9/1990  Redfield et al. ........................... 359/32

OTHER PUBLICATIONS

"Holographic Memories", by Psaltis, D. and Mok, F., *Scientific American*, pp. 70–76 (Nov. 1995).

*Primary Examiner*—Jon W. Henry
*Assistant Examiner*—Jared Treas
*Attorney, Agent, or Firm*—Scott J. Rittman

[57] ABSTRACT

A method for processing information stored in a holographic system, comprising the step of intersecting a reconstruction reference beam with a storage medium of a holographic system, the storage medium exhibiting birefringence at least partially due to coherent storage of information, wherein the reconstruction reference beam has a polarization at least 5° different from the polarization exhibited by a storage reference beam during storage information in the storage medium.

5 Claims, 1 Drawing Sheet

METHOD FOR PROCESSING INFORMATION STORED IN A HOLOGRAPHIC SYSTEM

BACKGROUND OF THE INVENTION

1. Field of the Invention

The invention relates to holographic systems, more particularly to retrieving information stored in such systems.

2. Discussion of the Related Art

Developers of information storage devices and methods continue to seek increased storage capacity. As part of this development, page-wise memory systems, in particular holographic systems, have been suggested as alternatives to conventional memory devices. Holographic systems typically involve the storage and readout of entire pages of information, these pages consisting of arrayed patterns representing information. In general, a holographic system stores, in three dimensions, holographic representations of the pages as patterns of varying refractive index and/or absorption imprinted into a storage medium. Holographic systems are discussed generally in D. Psaltis et al., "Holographic Memories," *Scientific American*, November 1995, the disclosure of which is hereby incorporated by reference.

Holographic systems are characterized by their high density storage potential and the potential speed at which the stored information is randomly accessed and retrieved. In fact, because information is typically manipulated, i.e., stored and retrieved, on a page-by-page basis, the speed of storage and retrieval compares favorably to conventional magnetic disk or compact disk storage systems. A significant advantage of holographic systems, however, is storage capacity. It is possible for each page stored as a holographic image to contain thousands or even millions of elements. Theoretically, it is believed that at the present time, up to $10^{14}$ bits of information are storable in approximately 1.0 cm$^3$ of holographic storage medium.

Unfortunately, retrieval and reproduction of the stored information is complicated by problems inherent to holographic systems. One such problem is diffraction efficiency, which is the ratio of the energy of the reconstructed beam traveling from the storage medium to the energy of the reference beam directed into the medium. Typically, the more information that is stored in a storage media, the worse the diffraction efficiency. Diffraction efficiency, however, determines in large part the accuracy and reliability of information retrieved and reproduced from a holographic system, as well as the speed at which the information is transferred. Thus, the goal of increasing the storage capacity of storage media is inherently inconsistent with the goal of improving the transfer rate of the system. Improvements in retrieving information from holographic systems, particularly in regard to enhancing diffraction efficiency, are therefore desirable.

SUMMARY OF THE INVENTION

The invention constitutes the recognition of and solution for a problem found in holographic systems. Some holographic storage media, in particular, storage media formed of a photopolymer disposed between two substrates, experience internal stresses. It is possible for these stresses to be caused by shrinkage of one of the materials of a medium, or by other physical factors. During the storage of information in a medium, these stresses, along with changes in the medium caused by the storage process, sometimes create a birefringence within the storage medium. This birefringence in turn reduces diffraction efficiency. The invention provides a process that reduces the detrimental effect of birefringence on diffraction efficiency. According to the process of the invention, the reference beam used to retrieve and reconstruct information from a storage medium in which such birefringence is introduced has a polarization different from (i.e., varies at least about 5° from) the polarization of the reference beam that was used to store the information in the medium. Using a different polarization during reconstruction compensates for birefringence in the medium, and thereby improves diffraction efficiency.

DETAILED DESCRIPTION OF THE INVENTION

Figure 1:
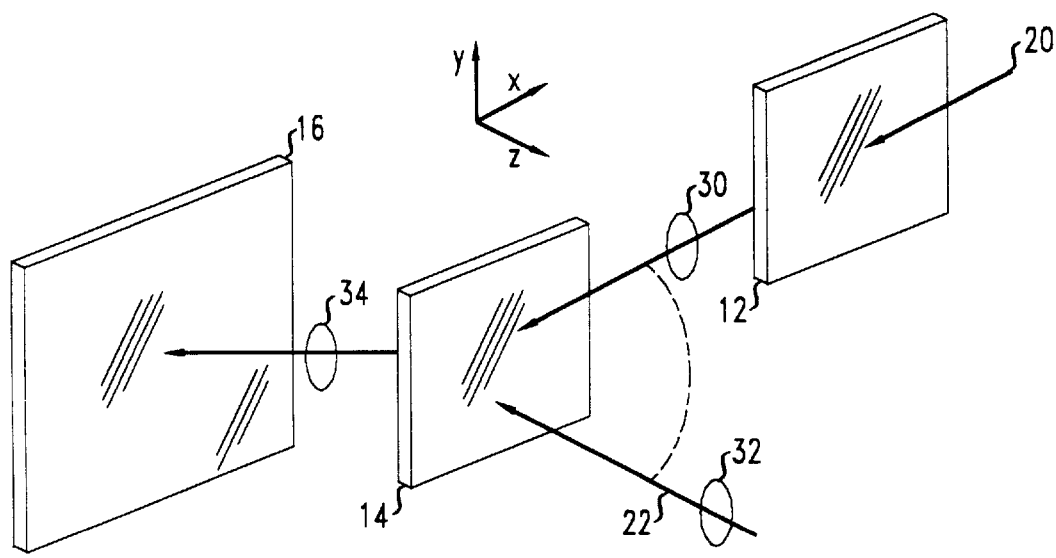
FIG. 1 shows the basic components of a holographic system.

The process of storing information in a storage medium causes changes in the medium at the areas where the information is stored. It is possible for these changes to introduce birefringence at these areas. Birefringence in the medium typically reduces diffraction efficiency, and the invention provides a solution to this problem. According to the process of the invention, the reference beam that is intersected with a medium in which such birefringence is introduced in order to retrieve information has or is adjusted to have a polarization different from (i.e., varies by at least about 5° from) the polarization exhibited by the reference beam used to store the information. This difference in polarization improves diffraction efficiency by compensating for the birefringence.

FIG. 1 illustrates the basic components of a holographic system 10, system 10 capable of both storing and retrieving information. System 10 contains a modulating device 12, a storage medium 14, and a sensor 16. It is possible for the system of the invention to be a storage system (in which sensor 16 would not be needed), a retrieval system (in which modulating device 12 would not be needed), or a storage and retrieval system (such as system 10). The term holographic system is intended to encompass at least all three of these possibilities. Modulating device 12 is any device capable of optically representing a two-dimensional page of information. Device 12 is typically a spatial light modulator that is attached to an encoding unit which encodes a page of information onto the modulator. Based on the encoding, device 12 selectively passes or blocks portions of a signal beam 20 passing through device 12. In this manner, beam 20 is encoded with an information page image. The page image is stored by interfering the encoded signal beam 20 with a reference beam 22 at a location on or within storage medium 14. The interference creates an interference pattern (or hologram) that is captured within storage medium 14 as a pattern of, for example, varying refractive index and/or absorption. It is possible for more than one holographic image to be stored at a single location, or for holograms to be stored in overlapping positions, by, for example, varying the angle or the wavelength of the reference beam 22. Signal beam 20 and reference beam 22 are polarized and have the same polarization when storing the hologram. Signal beam 20 typically passes through lens 30 before being intersected with reference beam 22 in the storage medium 14. It is possible for reference beam 22 to pass through lens 32 before this intersection. Signal beam 22 is typically a transform image from device 12, on any intermediate plane. This process of storing information is thereby performed with a coherent light beam, and is referred to herein as coherent storage. Storage medium 14 typically contains a photorefractive material such as a lithium niobate crystal, a photographic film, a photosensitive polymer, or a photochromatic or other radiation sensitive medium.

Once information is stored in medium 14, it is possible to retrieve the information by intersecting reference beam 22 with medium 14 at the same location and at the same angle or wavelength (or other method by which the information was stored) at which reference beam 22 was directed during storage of the information. Reference beam 22 is referred to herein as a storage reference beam during the process of storing information in the storage medium, and as a reconstruction reference beam during the process of information retrieval and reconstruction. The reconstructed information page passes through lens 34 and is detected by sensor 16. Sensor 16 is, for example, a charged coupled device or an active pixel sensor. Sensor 16 typically is attached to a unit that decodes the information page.

Birefringence in a storage medium is capable of detection by a polarization analyzer. A typical analyzer contains two polarizers aligned with their axes at a 90° angle to each other, with the medium located between the polarizers. Where a medium exhibits no birefringence, a light beam directed at the analyzer should not pass through the second polarizer. If the medium is birefringent and rotates the polarization of the light beam, some light will pass through the second polarizer. It is possible for a storage medium to exhibit a relatively small amount of birefringence, e.g., less than 5°, prior to storage of information and at locations where no information has been stored, and yet exhibit a birefringence greater than 5° at locations where information has been stored by coherent storage. Changes caused by the process of coherent storage induce this increased birefringence.

Storage media formed from a photopolymer disposed between two substrates often exhibit this birefringence induced by the process of coherent storage of information. Photopolymers are light-sensitive polymers capable of storing holographic images. Suitable polymers for storage media of holographic systems are discussed in co-assigned U.S. patent applications Ser. No. 08/698511 (our reference Colvin 2-8-3-19-11-10) and Ser. No. 08/698143 (our reference Colvin 1-2-16-10), the disclosures of which are hereby incorporated by reference. Methods of making storage media containing such photopolymers are discussed in co-assigned U.S. patent application No. 08/867,563, filed Jun. 2, 1997, for "Method for Fabricating a Multilayer Optical Article and a System Having a Multilayer Optical Article" (our reference Campbell 3-5-3), the disclosure of which is hereby incorporated by reference. Generally, the polymer is disposed in liquid form between two glass substrates and at least partially cured, with non-coherent light, to harden the polymer and promote adherence to the substrates. Most photopolymers shrink during this cure, and it is possible for the shrinkage to result in stresses that contribute to birefringence. Typically, the non-coherent cure used to form the polymer matrix is performed without introducing significant (e.g., >5°) birefringence.

The process of the invention is useful for reference beams of various types, including plane waves, spherical waves, and other complex wavefronts, such as discussed in U.S. patent application Ser. No. 08/435,705 (our reference Curtis 2–6), the disclosure of which is hereby incorporated by reference. It is possible for the reconstruction reference beam to be generated with a polarization different from that of the storage reference beam. It is also possible to rotate the reconstruction reference beam from its initial polarization. If the reconstruction reference beam is rotated, the rotation is performed by any suitable method. Examples include the use of half wave plates, quarter wave plates, general birefringent materials (e.g., quartz, lithium niobate), and faraday rotators. Both the degree of adjustment that improves the diffraction efficiency of a particular system, and the level of improvement attained, will depend on the individual system. For example, the angles of incidence of the signal and storage reference beams have a relatively small effect on the useful rotation and extent of improvement. The level of stresses and bulk index changes in the medium are the primary factors that determine the extent of the improvement in diffraction efficiency. And the polarization state of the signal beam and storage reference beam are important for the reasons below.

The effect that the process of the invention has on diffraction efficiency depends on the direction of stresses and birefringence in the particular storage medium. For example, the shrinkage stresses in the photopolymer storage medium discussed above are found primarily along lines perpendicular to the faces of the medium (i.e., along the z-axis of the storage medium 14 shown in FIG. 1). For such a medium, the process of the invention provides desirable results where at least a component of the polarized storage reference beam was in the plane of incidence during information storage. The plane of incidence is the plane defined by the signal beam and the storage reference beam of a holographic system, as represented by the dashed curve in FIG. 1 drawn between signal beam 20 and reference beam 22. The polarization of a beam can be expressed in terms of two orthogonal components. For example, in an x-y-z system, the polarization vector of a light beam directed along the x-axis has a component in the x-y plane and a component in the x-z plane. To compensate for z-direction stresses, the storage reference beam's polarization component in the plane of incidence should be at least about 30% of the overall polarization vector (as determined by passing a beam through a polarizer having its axis of transmission lying in the plane of incidence).

If the storage reference beam and the signal beam (during information storage) are polarized perpendicularly to the plane of incidence (i.e., have no polarization component in the plane of incidence), compensation for z-direction stresses in the storage media does not occur. This lack of compensation is due to the fact that the beams would then have no component in the plane that is distorted by the stresses and the bulk refractive index changes caused by the process of coherent storage. This is true for other types of storage media that similarly exhibit stresses in the z-direction. However, in the case of such z-direction stresses, it is possible for the reconstruction reference beam to have a polarization containing a relatively small component in the plane of incidence, since the compensation for birefringence does not depend on the plane in which the reconstruction reference beam lies.

Some storage media will exhibit stresses in the x and/or y directions, either in addition to or instead of z-direction stresses. For such media, it is possible to obtain improved diffraction efficiency in accordance with the above principles. In particular, the storage reference beam should have a polarization component that lies in the plane that experiences distortion due to the stresses in the media.

The invention will be further clarified by the following example, which is intended to be purely exemplary.

EXAMPLE 1

In a system such as that shown in FIG. 1, the signal beam (20) was a 532 nm complex beam encoded with random information from a spatial light modulator (12). The signal beam was Fourier transformed by a lens (30) and directed at the storage medium (14). The reference beam (22) was a plane wave. Both the signal beam and reference beam were polarized such they laid in the plane of incidence. The storage medium contained a photopolymer of a isobornyl acrylate-polytetrahydrofuran diurethane diacrylate matrix with n-vinylcarbazole dispersed therein (as disclosed in U.S. patent applications Ser. Nos. 08/698511 and 08/698143, referenced above). Specifically, the mole percentage of n-vinylcarbazole, relative to the total acrylate, was about 20%. The photopolymer was disposed between two, 1 mm thick glass substrates having an antireflection coating on their outer surfaces, according to the method disclosed in U.S. patent application "Method for Fabricating a Multilayer Optical Article and a System Having a Multilayer Optical Article," referenced above, and was precured approximately 90% during fabrication. After fabrication, but before coherent storage, no significant birefringence (e.g., >5°) was found in the medium upon examination by a polarization analyzer.

The signal beam, at 1 mW, and the reference beam, at 79 mW, were intersected in the storage media for 3 seconds to form a hologram of the random information, the hologram covering an area of about 2 mm². The full angle between the beams was about 70°, and the angle was bisected by a line normal to the face of the storage medium. The sample was then cured by a visible mercury lamp at a wavelength of about 560 nm for about 5 minutes.

When the object beam was blocked, the intensity of the reconstructed beam emerging from the storage medium was 0.2 mW. A lens (34) took the Fourier transform and projected the reconstructed image on a sensor (16). (The distance between the spatial light modulator and the sensor was four times the focal length of the two lenses (30 and 34).) A half wave plate for a 532 nm wavelength was then placed between the reference beam and the storage medium. The half wave plate was rotated in an attempt to increase the intensity of the reconstructed beam. At a polarization rotation of about 20° from the plane of incidence, the energy of the reconstructed beam was desirably high—the intensity of the reference beam emerging from the half wave plate was 71 mW, and the intensity of the reconstructed beam emerging from the storage media was 0.4 mW.

Thus, rotation of the polarization of the reconstruction reference beam, through use of the half wave plate, resulted in a two-fold increase in diffraction efficiency.

EXAMPLE 2

Using the same methods as Example 1, the process was evaluated for a reference beam useful in phase correlation multiplexing (as discussed in U.S. patent application Ser. No. 08/435,705, referenced above). The reference beam was produced by plane wave illumination of a binary $(0, \pi/2)$ random phase mask that was $4f$ imaged onto the storage medium with a blocking filter placed at the transform plane, the filter thereby removing the entire 0th order of the beam. An approximately two-fold increase in diffraction efficiency was found upon rotating the polarization of the reconstruction reference beam about 20°.

Other embodiments of the invention will be apparent to those skilled in the art from consideration of the specification and practice of the invention disclosed herein.

What is claimed is:

1. A method for processing information stored in a holographic system, comprising the step of:

intersecting a reconstruction reference beam with a storage medium of a holographic system, the storage medium comprising a photopolymer and the storage medium exhibiting birefringence at least partially due to coherent storage of information in the medium, wherein the reconstruction reference beam has a polarization at least 5° different from the polarization exhibited by a storage reference beam during storage of information in the storage medium.

2. The method of claim 1, wherein, during the storage of information in the storage medium, at least a component of the polarization vector of the storage reference beam existed in a plane defined by the storage reference beam and a signal beam.

3. The method of claim 2, wherein the component constitutes at least 30% of the polarization vector of the storage reference beam.

4. The method of claim 1, wherein the photopolymer is disposed between two substrates.

5. The method of claim 1, wherein the polarization of the reconstruction reference beam is altered by use of an article selected from a half-wave plate, a quarter-wave plate, a birefringent material, and a faraday rotator.

* * * * *